United States Patent
Chen et al.

(10) Patent No.: US 8,916,629 B2
(45) Date of Patent: Dec. 23, 2014

(54) COMPOSITIONS COMPRISING THERMOPLASTIC STARCH

(75) Inventors: Changping Chen, Jiangsu (CN); John Scheirs, Edithvale (AU)

(73) Assignee: Tristano Pty Ltd., Victoria (AU)

( * ) Notice: Subject to any disclaimer, the term of this patent is extended or adjusted under 35 U.S.C. 154(b) by 689 days.

(21) Appl. No.: 13/056,489

(22) PCT Filed: Jul. 31, 2009

(86) PCT No.: PCT/AU2009/000979
§ 371 (c)(1),
(2), (4) Date: Jul. 25, 2011

(87) PCT Pub. No.: WO2010/012041
PCT Pub. Date: Feb. 4, 2010

(65) Prior Publication Data
US 2012/0022188 A1    Jan. 26, 2012

(30) Foreign Application Priority Data
Jul. 31, 2008    (AU) ................................ 2008903922

(51) Int. Cl.
C08L 3/02    (2006.01)
C08L 23/06    (2006.01)
C08L 23/08    (2006.01)
C08J 5/18    (2006.01)
C08L 33/08    (2006.01)

(52) U.S. Cl.
CPC ............. C08L 23/0815 (2013.01); C08L 23/06 (2013.01); C08J 5/18 (2013.01); C08L 33/08 (2013.01); C08L 3/02 (2013.01); C08L 23/0853 (2013.01); C08L 23/0807 (2013.01); C08L 23/0869 (2013.01); C08J 2323/08 (2013.01)
USPC ............................................. 524/52; 524/47

(58) Field of Classification Search
USPC .................................................. 524/47, 52
See application file for complete search history.

(56) References Cited

U.S. PATENT DOCUMENTS

| 3,433,573 | A | 3/1969 | Holladay et al. |
| 4,337,181 | A | 6/1982 | Otey et al. |
| 4,770,912 | A * | 9/1988 | Furrer et al. .................. 428/35.5 |
| 5,047,253 | A | 9/1991 | Juhl et al. |
| 5,162,392 | A | 11/1992 | Wool et al. |
| 5,449,708 | A | 9/1995 | Schiltz |
| 5,654,353 | A | 8/1997 | Li et al. |
| 5,714,547 | A * | 2/1998 | Li et al. .......................... 525/240 |
| 6,231,970 | B1 | 5/2001 | Andersen et al. |
| 6,348,524 | B2 | 2/2002 | Bastioli et al. |
| 6,605,657 | B1 | 8/2003 | Favis et al. |
| 6,818,295 | B2 | 11/2004 | Bond et al. |
| 6,844,380 | B2 | 1/2005 | Favis et al. |
| 2003/0031765 | A1 | 2/2003 | Luthra et al. |
| 2008/0287592 | A1 | 11/2008 | Favis et al. |

FOREIGN PATENT DOCUMENTS

| CN | 1 099 399 | 3/1995 |
| CN | 1 113 918 | 12/1995 |
| EP | 0 032 802 | 7/1981 |
| EP | 0 965 615 | 11/2002 |
| EP | 1 265 957 | 2/2009 |
| JP | 40-024913 | 4/1960 |
| JP | 56-149444 | 11/1981 |
| JP | 02-261846 | 10/1990 |
| WO | 01/48078 | 7/2001 |
| WO | 2007/118280 | 10/2007 |
| WO | 2009/095622 | 8/2009 |
| WO | 2010/131134 | 11/2010 |

OTHER PUBLICATIONS

PCT International Search Report for PCT/AU2009/000979 mailed on Sep. 2, 2009.
Rodriguez-Gonzalez et al., 2003, "High performance LDPE/thermoplastic starch blends: a sustainable alternative to pure polyethylene", Polymer 44:1517-1526.

* cited by examiner

*Primary Examiner* — Angela C Scott
(74) *Attorney, Agent, or Firm* — Kenyon & Kenyon LLP.

(57) ABSTRACT

The invention relates to a composition comprising very low density polyethylene having a density of less than 0.905 $g/cm^3$, ethylene acrylic acid copolymer and thermoplastic starch and/or the constituent components thereof.

22 Claims, No Drawings

COMPOSITIONS COMPRISING THERMOPLASTIC STARCH

This application is a national stage application of International Application No. PCT/AU2009/000979, filed Jul. 31, 2009, which claims priority to Australian Application No. 2008903922, filed Jul. 31, 2008, each of which is incorporated by reference herein in its entirety.

FIELD OF THE INVENTION

The present invention relates in general to compositions comprising thermoplastic starch (TPS). In particular, the invention relates to compositions comprising TPS and polyolefin, to a method of preparing the same, and to products formed therefrom.

BACKGROUND OF THE INVENTION

With an ever increasing emphasis on sustainability and the environment, there has been a corresponding increase in research directed toward developing polymeric materials derived from or comprising renewable biologically derived components.

Much of the research to date in developing such polymeric materials has focussed on utilising naturally occurring biopolymers such as starch. Starch is attractive in that it is derived from renewal resources (i.e. plant products), readily available and relatively inexpensive. However, the mechanical properties of starch in its native form are quite poor compared with those of petroleum derived (i.e. "synthetic") polymers.

The mechanical properties of starch can be improved by melt mixing it with a plasticiser such as a polyhydric alcohol so as to form TPS. However, the improved mechanical properties of TPS still remain relatively poor compared with those of petroleum derived polymers.

Starch or TPS in its own right is therefore not considered a viable alternative to petroleum derived polymers.

In attempt to derive the benefits of starch and petroleum derived polymers, a considerable amount or research has been directed toward developing blends of these two polymer materials. However, combining relatively hydrophilic starch with petroleum derived polymers, which are typically hydrophobic, to produce blends with good mechanical properties has proven difficult in practice. In particular, melt processing starch or TPS with petroleum derived polymers generally results in the formation of polymer blends having a multiphase discontinuous morphology. Such morphologies are typically unstable and exhibit high interfacial tension, the like of which often has a negative impact on at least the mechanical properties of the resulting polymer blend.

Nevertheless, useful blends of starch or TPS and petroleum derived polymers have been developed. For example, polyester/TPS blends have been shown to exhibit good mechanical properties and can be formulated so as to be fully biodegradable. However, due to the hydrolytic sensitivity of the polyester matrix their application can be limited, for example such blends are not generally suited for melt-recycling.

Polyolefin/TPS blends (e.g. polyethylene/TPS blends) have also been developed. Due to the non-hydrolytic sensitivity of the polyolefin matrix, such blends are at least expected to be more suited to recycling than their polyester/TPS counterparts. However, the inherent incompatibility between the highly hydrophobic character of polyolefins and the hydrophilic character TPS has proven problematic in attaining blends with useful properties.

U.S. Pat. No. 6,605,657 discloses a method of preparing a polyolefin/TPS blend in which a relatively moisture free TPS is prepared in a first extrusion unit and then as a melt is combined with a polyolefin melt prepared in a second extrusion unit. The resulting blend is said to exhibit good mechanical properties. However, at least the method by which the blend is made is not without its shortcomings.

While polymer blends comprising both TPS and petroleum derived polymers have been developed, and opportunity remains to address or ameliorate one or more disadvantage or shortcoming associated with such blends and/or the methods by which such blends are prepared, or to at least provide a useful alternative polymer blend and/or method for preparing it.

SUMMARY OF THE INVENTION

The present invention therefore provides a composition comprising very low density polyethylene having a density of less than 0.905 g/cm$^3$, ethylene acrylic acid copolymer and thermoplastic starch and/or its constituent components.

It has now been found that compositions in accordance with the invention demonstrate excellent compatibility between the polymeric components as a blend and may be used to provide for polymer products that exhibit excellent properties.

Generally, the compositions in accordance with the invention will comprise about 5-25 wt. % very low density polyethylene (VLDPE), about 5-25 wt. % ethylene acrylic acid copolymer (EAA), and about 50-80 wt. % TPS and/or the constituent components thereof.

In one embodiment, the composition further comprises one or more polyethylene polymers having a density of greater than 0.905 g/cm$^3$. In that case, the one or more polyethylene polymers having a density of greater than 0.905 g/cm$^3$ will generally be present in an amount ranging from about 5-20 wt. %.

Separate from, or in addition to, the one or more polyethylene polymers having a density of greater than 0.905 g/cm$^3$, the compositions in accordance with the invention may also further comprise ethylene vinyl acetate copolymer (EVA). In that case, the EVA will generally be present in an amount ranging from about 1-10 wt. %.

The compositions in accordance with the invention are intended to embrace both pre-melt processed (i.e. a physical blend of the components) and post-melt processed (i.e. an integral intimate blend of the components) forms of the compositions. Having said this, it will be appreciated that a composition in accordance with the invention in its pre-melt processed form will generally be prepared for the sole purpose of being subsequently melt processed into a melt processed product.

The TPS per se may be present in a pre-melt processed composition, or it can advantageously be prepared in situ from its constituent components during melt processing of the composition. Accordingly, a pre-melt processed composition in accordance with the invention may comprise VLDPE, EAA, TPS and/or the constituent components of the TPS, namely starch and one or more plasticisers. Upon being melt processed, the starch and the one or more plasticisers in the composition will converted into TPS and the resulting melt processed composition will comprise VLDPE, EAA and TPS. In other words, in post-melt processed compositions in accordance with the invention it is the intention that any constituent components of TPS in the pre-melt processed composition will be substantially converted into TPS during melt processing.

The present invention also provides a method of preparing a polyolefin and thermoplastic starch blend, the method comprising melt processing a composition comprising very low density polyethylene having a density of less than 0.905 g/cm$^3$, ethylene acrylic acid copolymer, and thermoplastic starch and/or the constituent components thereof.

The composition that is to be melt processed in accordance with the method of the invention may further comprise one or more polyethylene polymers having a density greater than 0.905 g/cm$^3$. In addition to, or separate from, the one or more polyethylene polymers having a density greater than 0.905 g/cm$^3$, the composition that is to be melt processed in accordance with the method of the invention may also comprise EVA.

In one embodiment of the invention, a polyolefin and TPS blend is prepared by melt processing together (1) a polyolefin and TPS blend prepared in accordance with the invention, and (2) one or more polyethylene polymers having a density greater than 0.905 g/cm$^3$.

Melt processed polymer compositions in accordance with the invention have been found to exhibit desirable attributes such as low sensitivity to moisture, a surface amenable to printing, a high content of starch, excellent mechanical properties such as % elongation, and can be readily melt-recycled. Furthermore, such properties can be attained with a relatively high TPS content, which in turn minimises the amount of petroleum derived polymer in the composition.

Without wishing to be limited by theory, the excellent properties of products formed from compositions in accordance with the invention is believed to stem at least in part from the ability of the compositions to provide the TPS and polyethylene components in a highly compatibilised form. In some embodiments of the invention, the TPS and polyethylene components of the composition are believed to form stable a co-continuous phase morphology.

Further aspects of the invention are described in more detail below.

DETAILED DESCRIPTION OF THE INVENTION

As used herein, the expression "co-continuous phase morphology" in the context of TPS and polyethylene phase domains is intended to mean the topological condition in which a continuous path through either phase domain may be drawn to all phase domain boundaries without crossing any phase domain boundary. By the co-continuous phase morphology being "stable" is meant that the respective phase domains resist coalescence during or after melt processing.

Compositions in accordance with the invention comprise VLDPE having a density of less than 0.905 g/cm$^3$. Generally, the VLDPE will have a density ranging from about 0.85 g/cm$^3$ to 0.905 g/cm$^3$, for example from about 0.88 g/cm$^3$ to 0.905 g/cm$^3$. VLDPE is also known in the art as ultra low density polyethylene (ULDPE), and is generally a copolymer of ethylene and one or more alpha-olefins such as 1-butene, 1-hexene, and 1-octene.

The VLDPE will generally have a melt index at 190° C./2.16 kg of about 0.5 g/10 min to about 10 g/10 min.

Suitable VLDPE that may be used in accordance with the invention includes, but is not limited to, a ethylene/octene copolymer having a density of about 0.904 g/cm$^3$ and a melt index at 190° C./2.16 kg of about 4 g/10 min, and ethylene/butene copolymer having a density of about 0.884 g/cm$^3$ and a melt index at 190° C./2.16 kg of about 0.7 g/10 min, and an ethylene/butene copolymer having a density of about 0.8985 and melt index at 190° C./2.16 kg of about 5 g/10 min.

Reference herein to a density or melt index of a polyethylene polymer is intended to mean a density or melt index determined in accordance with ASTM D792 and ASTM D1238, respectively.

Compositions in accordance with the invention also comprise EAA. Those skilled in the art will appreciate that EAA is a copolymer of ethylene and acrylic acid. Generally, the acrylic acid content of the copolymer will range from about 5-20%, for example 8-15%. The EAA will also generally have a melt index at 190° C./2.16 kg ranging from about 10 g/10 min to about 20 g/10 min.

Suitable grades of VLDPE and EAA for use in accordance with the invention may be obtained commercially.

The compositions in accordance with the invention further comprise TPS and/or the constituent components thereof. Those skilled in the art will appreciate that TPS is a destructured form of starch comprising one or more plasticisers. Accordingly, as used herein, the expression "constituent components thereof" in the context of TPS is intended to mean the individual ingredients that are used to prepare the TPS.

Starch is found chiefly in seeds, fruits, tubers, roots and stem pith of plants, and is a naturally derived polymer made up of repeating glucose groups linked by glucosidic linkages in the 1-4 carbon positions. Starch consists of two types of alpha-D-glucose polymers: amylose, a substantially linear polymer with molecular weight of about $1\times10^5$; and amylopectin, a highly branched polymer with very high molecular weight of the order $1\times10^7$. Each repeating glucose unit typically has three free hydroxyl groups, thereby providing the polymer with hydrophilic properties and reactive functional groups. Most starches contain 20 to 30% amylose and 70 to 80% amylopectin. However, depending on the origin of the starch the ratio of amylose to amylopectin can vary significantly. For example, some corn hybrids provide starch with 100% amylopectin (waxy corn starch), or progressively higher amylose content ranging from 50 to 95%. Starch usually has a water content of about 15 wt. %. However, the starch can be dried to reduce its water content to below 1%.

Starch typically exists in small granules having a crystallinity ranging from about 15 to 45%. The size of the granules may vary depending upon the origin of the starch. For example, corn starch typically has a particle size diameter ranging from about 5 µm to about 40 µm, whereas potato starch typically has a particle size diameter ranging from about 50 µm to about 100 µm.

This "native" form of starch may also be chemically modified. Chemically modified starch includes, but is not limited to, oxidised starch, etherificated starch, esterified starch, cross-linked starch or a combination of such chemical modifications (e.g. etherificated and esterified starch). Chemically modified starch is generally prepared by reacting the hydroxyl groups of starch with one or more reagents. The degree of reaction, often referred to as the degree of substitution (DS), can significantly alter the physiochemical properties of the modified starch compared with the corresponding native starch. The DS for a native starch is designated as 0 and can range up to 3 for a fully substituted modified starch. Depending upon the type of substituent and the DS, a chemically modified starch can exhibit considerably different hydrophilic/hydrophobic character relative to native starch.

Both native and chemically modified starch generally exhibit poor thermoplastic properties. To improve such properties, the starch may be converted to TPS by means well known in the art. For example, native or chemically modified starch may be melt processed with one or more plasticisers. Polyhydric alcohols are generally used as plasticisers in the manufacture of TPS.

Reference herein to the wt. % of TPS is therefore intended to include the collective mass of both the starch and plasticiser constituent components of the TPS.

The starch from which the TPS may be derived includes, but is not limited to, corn starch, potato starch, wheat starch, soy bean starch, tapioca starch, hi-amylose starch or combinations thereof.

Where the starch is chemically modified, it will generally be etherificated or esterified. Suitable etherificated starches include, but are not limited to, those which are substituted with ethyl and/or propyl groups. Suitable esterified starches include, but are not limited to, those that are substituted with actyl, propanoyl and/or butanoyl groups.

In one embodiment of the invention, the starch used to prepare the TPS is corn starch or corn starch acetate having a DS>0.1.

The TPS will generally also comprise one or more polyhydric alcohol plasticisers. Suitable polyhydric alcohols include, but are not limited to glycerol, ethylene glycol, propylene glycol, ethylene diglycol, propylene diglycol, ethylene triglycol, propylene triglycol, polyethylene glycol, polypropylene glycol, 1,2-propanediol, 1,3-propanediol, 1,2-butanediol, 1,3-butanediol, 1,4-butanediol, 1,5-pentanediol, 1,6-hexanediol, 1,5-hexanediol, 1,2,6-hexanetriol, 1,3,5-hexanetriol, neo-pentyl glycol, trimethylol propane, pentaerythritol, mannitol, sorbitol, and the acetate, ethoxylate, and propoxylate derivatives thereof.

In one embodiment, the TPS comprises glycerol and/or sorbitol plasticisers.

The plasticiser content of the TPS will generally range from about 5 wt. % to about 50 wt. %, for example from about 10 wt. % to about 40 wt. %, or from about 10 wt. % to about 30 wt. %, relative to the combined mass of the starch and plasticiser components.

Compositions in accordance with the invention may be provided in the form of a pre-melt processed composition (e.g. a physical blend of the VLDPE, EAA and TPS and/or the constituent components thereof) or a post-melt processed composition (e.g. an integral intimate blend of the VLDPE, EAA and TPS).

Where the compositions in accordance with the invention provided in a pre-melt processed form, it will be appreciated that the compositions will generally be prepared so as to ultimately be melt processed and form a melt processed blend of the individual components therein. In that case, some or all of TPS can advantageously be replaced by the constituent components used to prepare TPS (i.e. starch and one or more plasticisers). In particular, it has been found that starch and one or more plasticisers can be melt processed in the presence of the VLDPE and EAA so as to produce a melt processed composition comprising VLDPE, EAA and TPS.

Compositions in accordance with the invention will generally comprise the VLDPE in an amount ranging from about 5 wt. % to about 25 wt. %, for example about 15 wt. %, the EAA in an amount ranging from about 5 wt. % to about 25 wt. %, for example about 15 wt. %, and the TPS and/or the constituent components thereof in an amount ranging from about 50 wt. % to about 80 wt. %, for example about 70 wt. %.

Where the compositions in accordance with the invention comprise constituent components of TPS, the total mass of these components may be considered equivalent to the mass of TPS per se and therefore the same weight percent ranges for the TPS outlined herein apply to these collective components. The relative weight percent ranges for each component of the TPS are also outlined herein.

Compositions in accordance with the invention may also comprise one or more polyethylene polymers having a density greater than 0.905 g/cm$^3$. For example, the composition may comprise low density polyethylene (LDPE) which is generally characterised as having a density in the range of 0.910 to 0.940 g/cm$^3$. Suitable grades of LDPE include, but are not limited to, those having a melt index at 190° C./2.16 kg of about 0.2 g/10 min to about 7 g/10 min.

In addition to or separate from LDPE, compositions may comprise linear low density polyethylene (LLDPE) which is generally characterised as having a density ranging from 0.915 g/cm$^3$ to 0.925 g/cm$^3$, medium density polyethylene (MDPE) which is generally characterised as having a density ranging from 0.926 g/cm$^3$ to 0.940 g/cm$^3$, and/or high density polyethylene (HDPE) which is generally characterised as having a density of greater or equal to 0.941 g/cm$^3$.

Suitable grades of LDPE, LLDPE, MDPE and HDPE for use in accordance with the invention may be obtained commercially.

When included, the one or more polyethylene polymers having a density greater than 0.905 g/cm$^3$ will generally be present in the compositions in an amount ranging from about 5 wt. % to about 20 wt. %.

For example, the compositions in accordance with the invention may comprise VLDPE in an amount of about 10 wt. %, EAA in an amount of about 10 wt. %, TPS and/or the constituent components thereof in an amount of about 65 wt. %, and LDPE in an amount of about 15 wt. %.

In addition to, or separate from, the one or more polyethylene polymers having a density greater than 0.905 g/cm$^3$, the compositions in accordance with the invention may also comprise EVA in an amount ranging from about 1 wt. % to about 10 wt. %.

For example, the composition may comprise VLDPE in an amount of about 10 wt. %, EAA in an amount of about 10 wt. %, TPS and/or the constituent components thereof in an amount of about 65 wt. %, LDPE in an amount of about 10 wt. %, and EVA in an amount of about 5 wt. %.

Compositions in accordance with the invention may also comprise one or more additives. Such additives may include fillers (e.g. calcium carbonate, talc, clays (e.g. montmorillonite), and titanium dioxide); pigments; anti-static agents; and processing aids (e.g. calcium stearate, steric acid, magnesium stearate, sodium stearate, oxidised polyethylene, oleamide, stearamide and erucamide).

Generally, the additives will be used in an amount ranging from about 0.5 wt. % to about 2 wt %.

Compositions in accordance with the invention provided in the form of a melt processed blend can be prepared according to the method of the invention.

Thus, according to the method of the invention a polyolefin and TPS blend is prepared by melt processing a composition comprising VLDPE, EAA, and TPS and/or the constituent components thereof.

Melt processing may be performed using techniques and equipment well known in the art. Generally, melt processing is achieved using continuous extrusion equipment, such as single screw extruders, twin screw extruders, other multiple screw extruders or Farrell continuous mixers. Melt processing is conducted for sufficient time and at a suitable temperature to promote intimate blending between the components of the composition. Those skilled in the art will appreciate that melt processing is generally performed within a suitable temperature range that this range will vary depending upon the nature of the polymer(s) being processed. Generally, the compositions in accordance with the invention will be melt processed at temperatures ranging from about 150° C. to about 210° C.

As indicated above, where the composition that is to be melt processed comprises the constituent components of TPS, the method in accordance with the invention advantageously converts these components during melt processing into TPS.

The composition to be melt processed in accordance with the method of the invention may be first physically blended in a high speed mixer. For example, the method may first comprise blending in a high speed mixer in the following order of addition starch, EAA, VLDPE and one or more polyhydric alcohols such as glycerol and/or sorbitol. Where one or more polyethylene polymers having a density greater than 0.905 g/cm$^3$ are used in the composition, these may be added directly after the VLDPE. Where EVA is used in the composition, it may be added directly after all the polyethylene polymers have been added. Where one or more additives are used in the composition, they may be added directly before the one or more plasticisers.

Where the compositions in accordance with the invention comprise one or more polyethylene polymers having a density greater than 0.905 g/cm$^3$, this polyethylene component(s) may form part of the composition that is melt processed in accordance with the method of the invention, or some or all of it may be introduced as part of a second melt processing step. For example, a polyolefin and TPS blend prepared in accordance with the method of the invention may be subsequently combined together with a polyethylene polymer having a density greater than 0.905 g/cm$^3$ and the mixture melt processed so as to incorporate further polyethylene polymer into the blend.

Thus, in one embodiment of the invention the method further comprises melt processing the so formed polyolefin and TPS blend with one or more polyethylene polymers having a density greater than 0.905 g/cm$^3$. In that case, about 40 wt. % to about 60 wt. % of the so formed polyolefin and TPS blend will generally be melt processed with about 60 wt. % to about 40 wt. % of one or more polyethylene polymers having a density greater than 0.905 g/cm$^3$.

The polyolefin and TPS blend in accordance with the invention have been found to exhibit a number of advantageous properties relative to a conventional polyolefin/TPS blend. For example, the blend in accordance with the invention demonstrates excellent % elongation even at high (e.g. about 40-50 weight %) TPS loadings. Products such as films formed from the composition can therefore exhibit improved puncture and tear resistance. The blend may also exhibit decreased sensitivity to moisture and a surface that is particularly suited for printing without being subjected to surface modification techniques such as coroner treatment. In particular, the blends can demonstrate a wettable surface (e.g. having a surface polarity equivalent to about 42-55 dynes) without being subject to surface treatments. Film formed from the composition can therefore be printed without first having to be subjected to surface treatment. Furthermore, the blend in accordance with the invention is well suited for melt-recycling.

The polyolefin and TPS blend in accordance with the invention is well suited for manufacturing films and moulded products. Such products can readily be used in many applications such as packaging.

Without wishing to be limited by theory, it is believed that the improved properties afforded by the blend in accordance with the invention is least in part due to the TPS and polyethylene phase domains of the blend being highly compatibilised. In particular, it is believed that the TPS and polyethylene phase domains can be provided with a co-continuous morphology. The high degree of compatibility between the polyethylene and TPS phases domains is believed to result from the unique blend of VLDPE in combination with EAA and TPS.

Embodiments of the invention are further described with reference to the following non-limiting examples.

EXAMPLES

Example 1

The components listed below in Table 1 (composition A) were first blended in a high speed mixer in the following order of addition: starch, EAA, VLDPE, LDPE, Calcium stearate, stearic acid, glycerol, and sorbitol. The resulting physical blend was then melt processed on a vented twin screw extruder having melt profile 140/170/175/175/165/155 deg. C, torque<80%, screw speed 320-350 rpm, vacuum of −0.05 bar and output of 200 kg/h to provide for Blend A. Film was then blown from a composition of 50 wt. % Blend A and 50 wt. % LLDPE. The resulting film had a gauge of 15 micron, a tensile strength at break of 14 MPa, and an elongation of >200% as tested using a universal tensile testing machine.

TABLE 1

| Composition A | | | |
|---|---|---|---|
| Component | Grade and Supplier | Amount | % |
| Cornstarch | Grade: Eatable or industry first class products<br>Supplier: Shandong Zhucheng Starch Pty Ltd.<br>Degree of Substitution: >0.1 | 50 kg/100.8 kg | 49.60 |
| Glycerol | Grade: saponification Glycerol or vegetal Glycerol<br>Supplier: Nanjing Soap factory<br>Purity: ≥96%<br>Boiling Point: >250 deg. C. | 11 kg/100.8 kg | 10.91 |
| Sorbitol | Grade: industry Sorbitol<br>Supplier: Jiangsu Luo'er Gaici Pty Ltd.<br>Purity: ≥70%<br>Boiling Point: ≈100 deg.C | 5 kg/100.8 kg | 4.96 |
| EAA | Grade: Primacor 3340<br>Supplier: DOW<br>MFI: 10.5 g/10 mins (190 deg. C./2.16 kg)<br>Density: 0.938 g/cm3<br>ethylene-acrylic acid copolymer having an acrylic acid content of 9.5% | 12 kg/100.8 kg | 11.91 |

TABLE 1-continued

Composition A

| Component | Grade and Supplier | Amount | % |
|---|---|---|---|
| VLDPE | Grade: Attane 4404<br>Supplier: DOW<br>MFI: 4 g/10 mins (190 deg. C., 2.16 kg)<br>Density: 0.904 g/cm3 | 10 kg/100.8 kg | 9.92 |
| LDPE | Grade: 1FTB<br>Supplier: Beijing Yanshan Pty Ltd.<br>MFI: 7 g/10 mins (190 deg. C., 2.16 kg)<br>Density: 0.92 g/cm3 | 12 kg/100.8 kg | 11.91 |
| Stearic acid | Grade: 1801<br>Supplier: Shanghai factory | 0.5 kg/100.8 kg | 0.49 |
| Calcium stearate | Grade: 1801<br>Supplier: Supplier: Shanghai factory | 0.3 kg/100.8 kg | 0.30 |
| total | | 100.8 kg | 100% |

Example 2

The components listed below in Table 2 (composition B) were first blended in a high speed mixer in the following order of addition: starch, LDPE, VLDPE, EAA, Calcium stearate, stearic acid, glycerol, and sorbitol. The resulting physical blend was then melt processed on a vented twin screw extruder having melt profile 140/170/175/175/165/155 deg. C, torque<80%, screw speed 320-350 rpm, vacuum of −0.05 bar and output of 200 kg/h to provide for Blend B. Film was then blown using Blend B. The resulting film had a tensile strength at break of greater than 10 MPa, and an elongation of >250% as tested using a universal tensile testing machine. The film exhibited excellent antiblock and anti-static properties.

Example 3

The components listed below in Table 3 (composition C) were first blended in a high speed mixer in the following order of addition: starch, EAA, VLDPE, EVA LDPE, Calcium stearate, stearic acid, glycerol, and sorbitol. The resulting physical blend was then melt processed on a vented twin screw extruder having melt profile 140/165/170/170/170/155 deg. C, torque<80%, screw speed 320-350 rpm, vacuum of −0.05 bar and output of 200 kg/h to provide for Blend C. Blend C was formed into a foam buy melt processing it with a conventional blowing agent masterbatch. The resulting foam is suitable as a soft foam packaging material and has excellent softness and soft touch properties.

TABLE 2

Composition B

| Component | Grade and Supplier | Amount | % |
|---|---|---|---|
| Cornstarch | Grade: Eatable or industry first class products<br>Supplier: Shandong Zhucheng Starch Pty Ltd.<br>Degree of Substitution: >0.1 | 42 kg/100.8 kg | 41.66 |
| Glycerol | Grade: saponification Glycerol or vegetal Glycerol<br>Supplier: Nanjing Soap factory<br>Purity: ≥96%<br>Boiling Point: >250 deg. C. | 11 kg/100.8 kg | 10.91 |
| Sorbitol | Grade: industry Sorbitol<br>Supplier: Jiangsu Luo'er Gaici Pty Ltd.<br>Purity: ≥70%<br>Boiling Point: ≈100 deg. C. | 10 kg/100.8 kg | 9.92 |
| EAA | Grade: Primacor 3340<br>Supplier: DOW<br>MFI: 10.5 g/10 mins (190 deg. C./2.16 kg)<br>Density: 0.938 g/cm3<br>ethylene-acrylic acid copolymer having an acrylic acid content of 9.5% | 12 kg/100.8 kg | 11.91 |
| VLDPE | Grade: Attane 4404<br>Supplier: DOW<br>MFI: 4 g/10 mins (190 deg. C., 2.16 kg)<br>Density: 0.904 g/cm3 | 10 kg/100.8 kg | 9.92 |
| LDPE | Grade: 1FTB<br>Supplier: Beijing Yanshan Pty Ltd.<br>MFI: 7 g/10 mins (190 deg. C., 2.16 kg)<br>Density: 0.92 g/cm3 | 15 kg/100.8 kg | 14.89 |
| Stearic acid | Grade: 1801<br>Supplier: Shanghai factory | 0.5 kg/100.8 kg | 0.49 |
| Calcium stearate | Grade: 1801<br>Supplier: Supplier: Shanghai factory | 0.3 kg/100.8 kg | 0.30 |
| total | | 100.8 kg | 100% |

TABLE 3

Composition C

| Ingredient | Grade and Supplier | Amount | % |
|---|---|---|---|
| Cornstarch | Grade: Eatable or industry first class products<br>Supplier: Shandong Zhucheng Starch Pty Ltd.<br>Degree of Substitution: >0.1 | 50 kg/105.8 kg | 47.23 |
| Glycerol | Grade: saponification Glycerol or vegetal Glycerol<br>Supplier: Nanjing Soap factory<br>Purity: ≥96%<br>Boiling Point: >250 deg. C. | 11 kg/105.8 kg | 10.42 |
| Sorbitol | Grade: industry Sorbitol<br>Supplier: Jiangsu Luo'er Gaici Pty Ltd.<br>Purity: ≥70%<br>Boiling Point: ≈100 deg. C. | 5 kg/105.8 kg | 4.72 |
| EAA | Grade: Primacor 3340<br>Supplier: DOW<br>MFI: 10.5 g/10 mins (190 deg. C./ 2.16 kg)<br>Density: 0.938 g/cm3<br>ethylene-acrylic acid copolymer having an acrylic acid content of 9.5% | 12 kg/105.8 kg | 11.34 |
| VLDPE | Grade: Attane 4404<br>Supplier: DOW<br>MFI: 4 g/10 mins (190 deg. C., 2.16 kg)<br>Density: 0.904 g/cm3 | 10 kg/105.8 kg | 9.45 |
| LDPE | Grade: 1FTB<br>Supplier: Beijing Yanshan Pty Ltd.<br>MFI: 7 g/10 mins (190 deg. C., 2.16 kg)<br>Density: 0.92 g/cm3 | 11 kg/105.8 kg | 10.42 |
| EVA | Grade: 14-2, V4110J<br>Supplier: Beijing Yanshan Pty Ltd., Yangzi Pty Ltd.<br>MFI: 2 g/10 mins (190 deg. C., 2.16 kg)<br>Density: 0.93 g/cm3 | 6 kg/105.8 kg | 5.67 |
| Stearic acid | Grade: 1801<br>Supplier: Shanghai factory | 0.5 kg/105.8 kg | 0.47 |
| Calcium stearate | Grade: 1801<br>Supplier: Supplier: Shanghai factory | 0.3 kg/105.8 kg | 0.28 |
| total | | 105.8 | 100% |

Example 4

Blend B was melt processed with 20 wt. % LDPE (melt index 0.3 g/10 mins and density of 0.922 g/cm³) and formed into sheet of 0.380 mm thickness. The resulting sheet was thermoformed into a cuspated sheet.

Example 5

Blend B was blown into 50 micron film and then converted into shopping bags with a loading carrying capacity of 6 kg. The bags were found to have comparable tear, tensile and elongational properties to bags made from HDPE. The film can be easily printed using conventional processes and without Corona pre-treatment.

Example 6

Blend B was melt processed with 10 wt. % HDPE and blown into a film suitable for use in shopping bag applications. The resulting film was found to be 100% more stiff than a comparable film made from just Blend B.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A composition comprising very low density polyethylene having a density of less than 0.905 g/cm³, ethylene acrylic acid copolymer having a melt index at 190° C./2.16 kg ranging from 10 g/10 min to 20 g/10 min, one or more polyethylene polymers having a density of greater than 0.905 g/cm³, and thermoplastic starch and/or the constituent components thereof.

2. The composition according to claim 1, wherein the very low density polyethylene has a density ranging from about 0.85 g/cm³ to 0.905 g/cm³.

3. The composition according to claim 1 in the form of a physical blend.

4. The composition according to claim 1 in the form of a melt processed blend.

5. The composition according to claim 1, wherein the very low density polyethylene is present in an amount ranging from about 5 wt. % to about 25 wt. %, the ethylene acrylic acid copolymer is present in an amount ranging from about 5 wt % to about 25 wt. %, and the thermoplastic starch and/or the constituent components thereof is present in amount ranging from about 50 wt. % to about 80 wt. %.

6. The composition according to claim 1 further comprising ethylene vinyl acetate copolymer in an amount ranging from about 1 wt. % to about 10 wt. %.

7. The composition according to claim 1, wherein the one or more polyethylene polymers having a density of greater than 0.905 g/cm$^3$ is selected from low density polyethylene, linear low density polyethylene, medium density polyethylene, and high density polyethylene.

8. The composition according to claim 1, wherein the one or more polyethylene polymers having a density of greater than 0.905 g/cm$^3$ is present in an amount ranging from about 5 wt. % to about 20 wt. %.

9. The composition according to claim 1 further comprising one or more additives selected from calcium stearate, steric acid, magnesium stearate, sodium stearate, oxidised polyethylene, oleamide, stearamide and erucamide.

10. A method of preparing a polyolefin and thermoplastic starch blend, the method comprising melt processing a composition comprising very low density polyethylene having a density of less than 0.905 g/cm$^3$, ethylene acrylic acid copolymer having a melt index at 190° C./2.16 kg ranging from 10 g/10 min to 20 g/10 min, one or more polyethylene polymers having a density of greater than 0.905 g/cm$^3$, and thermoplastic starch and/or the constituent components thereof.

11. The method according to claim 10, wherein the very low density polyethylene has a density ranging from about 0.85 g/cm$^3$ to 0.905 g/cm$^3$.

12. The method according to claim 10, wherein the very low density polyethylene is present in an amount ranging from about 5 wt. % to about 25 wt. %, the ethylene acrylic acid copolymer is present in an amount ranging from about 5 wt. % to about 25 wt. %, and the thermoplastic starch and/or the constituent components thereof is present in an amount ranging from about 50 wt. % to about 80 wt. %.

13. The method according to claim 10, wherein the composition to be melt processed further comprises ethylene vinyl acetate copolymer in an amount ranging from about 1 wt. % to about 10 wt. %.

14. The method according to claim 10, wherein the one or more polyethylene polymers having a density greater than 0.905 g/cm$^3$ is selected from low density polyethylene, linear low density polyethylene, medium density polyethylene, and high density polyethylene.

15. The method according to claim 10, wherein the one or more polyethylene polymers having a density of greater than 0.905 g/cm$^3$ is used in an amount ranging from about 5 wt. % to about 20 wt. %.

16. The method according to claim 10, wherein the so formed polyolefin and thermoplastic starch blend is melt processed with one or more polyethylene polymers having a density greater than 0.905 g/cm$^3$.

17. The method according to claim 16, wherein the one or more polyethylene polymers having a density greater than 0.905 g/cm$^3$ that is melt processed with the so formed polyolefin and thermoplastic starch blend is selected from low density polyethylene, linear low density polyethylene, medium density polyethylene, and high density polyethylene.

18. The method according to claim 16, wherein the so formed polyolefin and thermoplastic starch blend and the one or more polyethylene polymers having a density greater than 0.905 g/cm$^3$ are melt processed together in amounts ranging from about 40 wt. % to about 60 wt. % and about 40 wt. % to about 60 wt. %, respectively.

19. An article comprising or produced from a composition according to claim 1.

20. The article according to claim 19 in the form of an extruded or moulded product.

21. The article according to claim 20 in the form of a film.

22. An article produced according to the method of claim 10.

* * * * *